July 16, 1963  E. C. GODSIL ETAL  3,097,543
VARIABLE-THROW CAM
Filed July 5, 1962
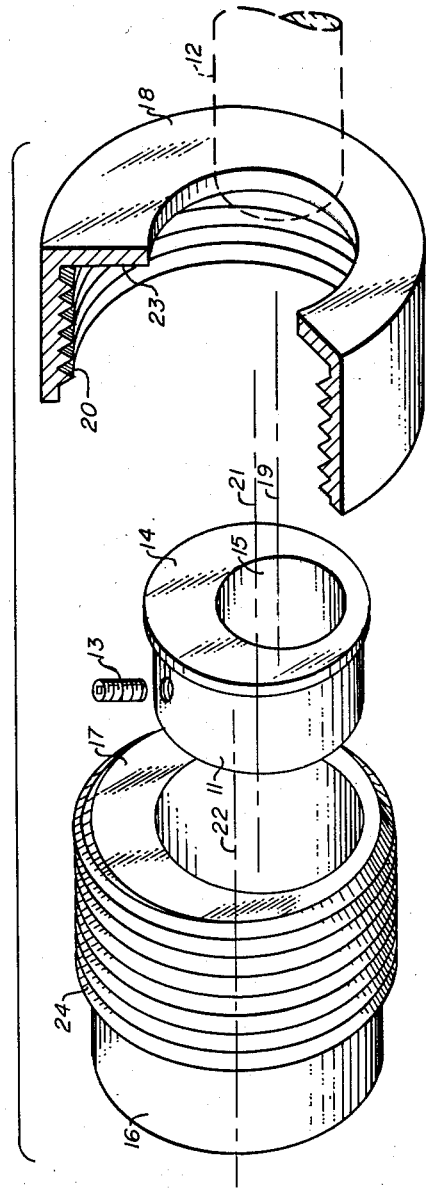
INVENTOR.
EDWARD C. GODSIL
ERNEST Y. ROBINSON
BY
ATTORNEY

United States Patent Office 3,097,543
Patented July 16, 1963

3,097,543
VARIABLE-THROW CAM
Edward C. Godsil and Ernest Y. Robinson, Livermore, Calif., assignors to the United States of America as represented by the United States Atomic Energy Commission
Filed July 5, 1962, Ser. No. 207,826
2 Claims. (Cl. 74—568)

This invention relates to cams and, more particularly, to a cam having a continuously variable throw.

Eccentric cylindrical cams are commonly used to convert rotary to reciprocating motion. In general, this type of cam comprises a solid cylinder through which a hole is bored on an axis parallel to the cylinder axis, but radially displaced from it. The "throw" of such a cam, that is, the maximum displacement of the cam follower, is equal to twice the distance between the cylinder axis and the bore axis. It is thus obvious that the throw of any given cam is fixed by its geometry. In certain applications, however, it is necessary to vary the throw of the cam. For example, in the cyclic fatigue testing of materials, a cam-driven ram is periodically forced against a test specimen. In order to vary the strain on the specimen, the stroke of the ram is changed by substituting cams having different throws. In addition to the time and effort involved in removing cams from the driveshaft and substituting others, it is apparent that the cam throw is variable only in discrete increments; that is, not continuously. In order to have a continuously variable cam throw, it would be necessary to have an infinite series of cams, each cut for a different throw.

The present invention provides a cam having a continuously variable throw, within limits. Briefly, the cam comprises inner and outer eccentric sleeves which are adjustably locked together. The cam throw is varied by unlocking the inner and outer sleeves, rotating the outer sleeve relative to the inner one until the desired throw is obtained, and locking the sleeves together again.

Accordingly, the main object of the invention is to provide a cam having a continuously variable throw.

The invention will be described with reference to the accompanying drawing, of which the sole FIGURE is in exploded view of the cam mounted on a driveshaft.

Referring now to the drawing, there is shown an inner eccentric sleeve 11 which is mounted on a driveshaft 12 (shown in dotted outline) by means of a setscrew 13. Driveshaft 12 fits into a hole 15 which is bored eccentrically in sleeve 11. An annular shoulder 14 is formed on one end of sleeve 11. Inner sleeve 11 is rotatably disposed within an outer eccentric sleeve 16 so that shoulder 14 butts against one of the two planar end surfaces of sleeve 16. This end surface is numbered 17 for reference purposes. A locking collar 18, having internal threads 20 and an inwardly-extending flange 23, fits over shoulder 14 and engages external threads 24 formed into sleeve 16 adjacent surface 17. For the purpose of illustrating the operation of the cam, the driveshaft axis is numbered 19, the inner sleeve axis is numbered 21, and the outer sleeve axis is numbered 22.

The throw of the cam, at any setting, is equal to twice the distance between axes 19 and 22. In order to change this distance, i.e., vary the cam throw, it is only necessary to loosen collar 18, rotate sleeve 16 about axis 21 until the desired throw is obtained, and re-tighten collar 18. The maximum throw is obtained when axis 21 lies between and in the same plane as axes 22 and 19. The minimum throw is obtained when axis 19 lies between and in the same plane as axes 21 and 22. Zero throw, i.e., no motion of the cam follower, occurs at the cam setting where axes 19 and 22 coincide with one another. The cam can be calibrated by actual measurement of the follower throw, together with the placement of matching index lines on shoulder 14 and surface 17. Any desired cam throw can then be dialed directly by matching the appropriate index lines.

There is a further feature of the cam which may not be obvious from an inspection of the drawing. Once a setting has been selected, and the collar tightened, any subsequent relative rotation between sleeves 11 and 16 tends to tighten the collar still further, thereby preserving the original cam setting. This effect can be more easily understood by assuming a right-hand thread on collar 18 and a clockwise rotation of shaft 12 (as seen looking along the shaft towards the collar). If shoulder 14 slips within the collar, it tends to drag the collar along in a clockwise direction. This tightens the collar against sleeve 16 which, in turn, forces shoulder 14 more tightly against surface 17. It is thus apparent that slippage between the sleeves tends to correct itself by tightening up the collar.

Although the outer surface of sleeve 16 has been described and illustrated as being that of a circular cylinder, those skilled in the art will recognize that it may have a different surface contour to provide more complex motion of the cam follower. For example, the surface may be that of an elliptical cylinder, a cylinder having a cardioid cross section, or other complex contour. In addition, a circumferential groove may be formed into the outer surface of sleeve 16, in the manner of a barrel cam, so as to introduce a velocity component into the motion of the cam follower which is parallel to axis 22.

Although a preferred embodiment and several modifications of the invention have been described, these are intended to be merely illustrative, and further modifications may be made without departing from the spirit and scope of the invention as defined in the following claims.

What is claimed is:
1. A variable-throw cam comprising,
 (a) a first cylindrical sleeve having a hole bored therein on an axis parallel to and displaced from the cylinder axis, said sleeve having a radially-extending shoulder formed on one end thereof,
 (b) means for fixing said first sleeve to a driving shaft fitted into said hole,
 (c) a second cylindrical sleeve eccentrically disposed around said first cylindrical sleeve and being selectively rotatable relative to said first sleeve, said second sleeve having external threads formed adjacent one end thereof which end lies adjacent the shoulder of said first sleeve,
 (d) and an annular internally-threaded locking collar fitting over said first sleeve and engaging the threads on said second sleeve, said collar having means coacting with said shoulder and a portion of said second sleeve for maintaining said first and second sleeves in a fixed angular spaced relation.
2. The cam of claim 1, wherein the directrix of said second cylindrical sleeve is a circle.

References Cited in the file of this patent

UNITED STATES PATENTS 2,477,587  Doutt _____ Aug. 2, 1949
2,547,197  Conner _____ Apr. 3, 1951